Dec. 14, 1926.

H. W. LLOYD

FLUID CLUTCH OR TRANSMISSION

Filed Oct. 7, 1924

1,610,457

INVENTOR
H. W. Lloyd
BY
ATTORNEY

Patented Dec. 14, 1926.

1,610,457

UNITED STATES PATENT OFFICE.

HARRY W. LLOYD, OF YONKERS, NEW YORK.

FLUID CLUTCH OR TRANSMISSION.

Application filed October 7, 1924. Serial No. 742,100.

This invention relates to power transmission systems and particularly to combined hydraulic clutch and gear transmission mechanisms.

Among the objects of this invention is to provide a combined clutch and transmission mechanism comprising a body for directly or indirectly coupling together a drive and a driven shaft, and for rotating said driven shaft in one or in a reverse direction.

Another object of this invention is to provide a combined hydraulic clutch and gear transmission mechanism comprising fluid actuating means, throttle means co-operating therewith to exert a resistance to the flow of said fluid, said resistance being transmitted as a turning moment to the driven shaft, and a direction reversing system to rotate said driven shaft in an opposite direction when said throttle means is open, said mechanism being so arranged in its various actuating or power transmitting parts as to secure perfect balancing of the same.

With the foregoing and other objects in view the invention consists in the combination and arrangement of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 2:
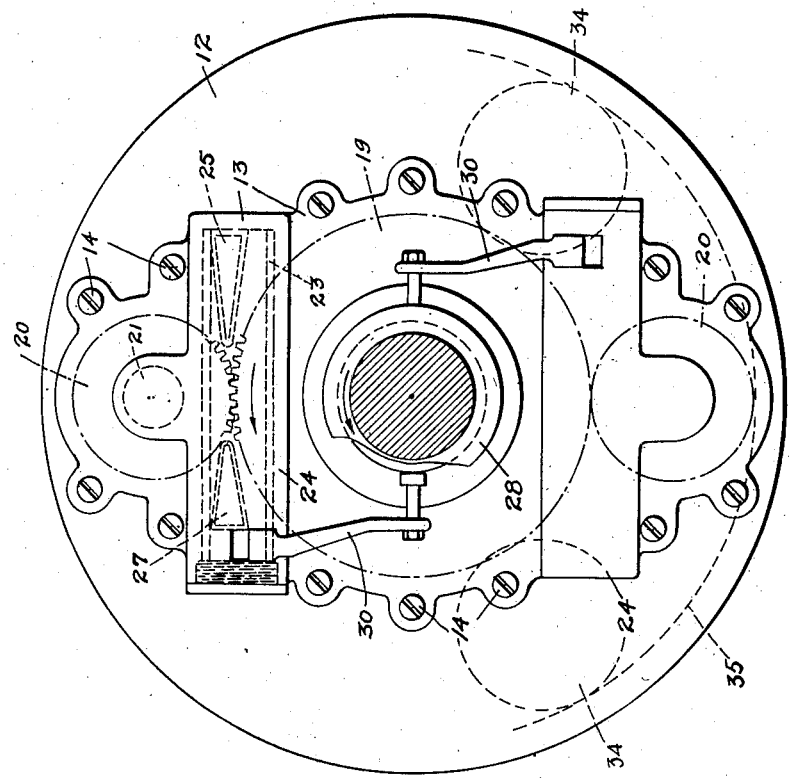
Fig. 2 is an end view of the same.
Figure 1:
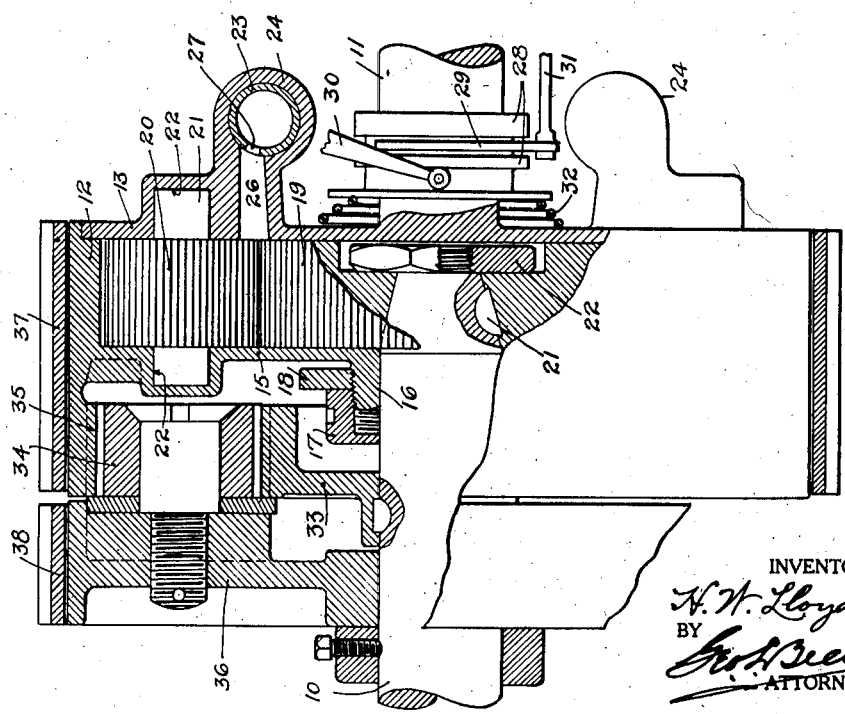
Figure 1 is a view of the mechanism showing the internal construction thereof.

Referring now more particularly to the drawings 10 represents a drive shaft and 11 a driven shaft, said drive and driven shafts being coupled together for direct or indirect transmission of power as will soon be described by means of mechanism comprising a body or casing including a member 12 and a cover plate 13 or the like secured thereto in any suitable manner as by screws 14, the driven shaft being preferably secured to said cover plate for rotation. The member 12 is preferably of cylindrical form and has an internal partition 15 at right angles to the axis thereof, said partition having an axial bearing 16 to receive the drive shaft, a stuffing box 17 co-operating with a locknut 18 being provided to render the bearing fluidtight. The position shown in the drawings is that in which the direct drive is idle.

When the driven shaft is to rotate in normal direction, the transmission of power thereto from the drive shaft is accomplished by means of an hydraulic pump located within the cylinder 12 and between the plates 13 and 15. This pump consists preferably of a main or driving gear 19 meshing with a plurality of driven gears 20 of reduced diameter relatively to the main gear. The main gear is secured directly to the end of the drive shaft as by a key 21 and a nut 22 threaded to the end of said shaft, thus rotating at all times directly with the drive shaft. The gears 20 are supported upon shafts 21 journaled within the bearings 22. Throttle means such as valves 23 are arranged for axial rotation within the extensions 24, thus constituting a by-pass arrangement for the fluid under compression. Since the clearances in the pump are very slight, the oil or fluid used which is carried by the gears between the successive teeth thereof so as to substantially fill the chamber of the pump, is forced out from between the gears at the point of meshing. There is therefore an accumulation of fluid at this point which being confined reacts upon the casing of the pump to impart thereto the force exerted by the drive shaft to actuate the main gear. Since this force is eccentric to the casing a tendency to rotate said casing is produced, balancing of the mechanism being obtained because a pressure zone is created within the pump at a plurality of points about the axis thereof.

Since this pump is of the positive pressure type, by-pass means are provided as aforesaid to relieve the pressure, and since this by-pass comprises an adjustable throttle, for varying the resistance to the flow of the fluid, and consequently the turning moment upon the mechanism, a variation in the speed of the driven shaft relatively to the drive shaft can be secured. Or more specifically, the throttle or valve has an inlet port 25 communicating with the high pressure zone aforesaid through a passage 26, and an outlet port 27 communicating with a low pressure region located upon the opposite side of the gears from the high pressure region and at the point where the gear teeth part from each other.

For operating the valve a slidable collar 28 may be mounted upon the driven shaft, said collar co-operating with a yoke 29 to be slidable thereby along said shaft, an arm 30 extending from the valve to the collar to render the valve rotatable for varying the throttling effect thereof. The collar is operated manually in any suitable manner as by means of a lever 31 within easy reach of the driver of the automobile, a spring 32 being used to automatically lock the device by an expansion thereof.

In co-operation with the direct variable speed drive disclosed above, I provide a reversing mechanism which while conventional in its details of construction, is applied to the transmission system in a novel manner and is extremely simple and inexpensive in construction. Thus a gear 33 is secured to the drive shaft, said gear actuating one or more pinions 34 which mesh with an annular gear 35 formed within the member 12. The pinions are supported by a carrier 36 which is journaled upon the drive shaft for independent rotation, said carrier being of cylindrical form. A plurality of these pinions are located about the shaft to secure balancing of the transmission. Individual brakes 37 and 38 co-operate with the members 12 and 36 respectively, the former of which is adapted to control the rotation of the member 12 and consequently of the driven shaft, while the latter which is adapted to operate when the reversing mechanism is to be used, by gripping the member 36 renders the axes of the pinions 34 stationary, thus causing the drive shaft to turn the member 12 in a reverse direction and at a low speed through the gear 33 and the annular gear 35 co-operating with the pinions as aforesaid. When driving in normal direction, however, this brake is released, thus permitting the carrier 36 to turn idly about the drive shaft. The valve at such time is closed or partly closed as determined by the speed at which the operator wishes to drive his car or other machine. When, however, the reversing mechanism is used the valve is opened completely thereby permitting a free and idle flow of the oil through the pump and by-pass.

The simplicity and utility of this combined hydraulic clutch and gear transmission will be apparent to those skilled in the art, and particularly to those who are experienced with the handling of automobiles. An inexpensive clutch and transmission is provided which can not only perform the work of the complicated and costly devices at present in use, but which provides an unlimited range of speed regulation from zero to maximum in accordance with the adjustment of the valve. Moreover, due to the perfect balancing of the mechanism, not only is an exceedingly uniform drive obtained, but any tendency of the members to distort is eliminated thus permitting the pump to offer uniformly efficient and satisfactory service.

This transmission mechanism is designed primarily for application to Ford cars, for which application no substantial change in any other parts of the standard machine, outside the transmission, is required. I do not wish, however, to be understood as intending by this statement to limit or restrict the adaptability of my improvement to various other machines where it may be employed to good advantage.

The casing extension remote from the driven shaft provides not only an overhang or housing for the internal low speed reversing gear 35 but also an extra long or wide friction surface for the brake band 37, thus insuring a control of the car vastly superior to that afforded by the usual narrow brake band.

While the throttles 23 are closed and the driving and driven shafts are coupled through the body or casing for direct maximum speed, the casing and contained parts act as a flywheel, all parts of which are perfectly balanced for high speed rotation without vibration, and, moreover, I wish to point out that in such direct coupled condition the levers 30 are held by the spring 32 so spaced beyond the plane of the throttles that the only effect of centrifugal force thereon is to insure that the throttle ports will be kept reliably closed.

I claim:

1. The herein described mechanism comprising a body having an open end and a closed end, a pump located within said closed end, a driven shaft connected to said end, said open end being bounded by an internal gear, a gear train meshing with said internal gear and housed within said open end, a drive shaft, means for connecting said drive shaft to operate said train to rotate said body in one direction, said pump being operative by said drive shaft, and throttle means rotatable with said body for offering a resistance to the flow of a fluid compressed by said pump, said throttle means being eccentric to said body whereby the reaction of the throttle is taken up by said body as a moment for turning the body in an opposite direction relatively to that of the gear drive.

2. The herein described transmission for Ford cars comprising a casing having a fluid tight compartment for propulsion fluid, propulsion mechanism within said compartment and including a main central gear and a plurality of other gears meshing therewith, a driving shaft connected to said main gear, a driven shaft connected to the casing in alinement with the driving gear, and fluid flow controlling means including a plurality of levers surrounding the axis of the shafts, all of said parts being balanced with respect to the axis to prevent vibration, and said levers being so designed as to tend to be thrown outward from the axis by centrifugal force to insure the throttling of the fluid flow mechanism.

3. The herein described mechanism comprising a rotary body having an open end and a closed end, a pump located within said closed end, a driven shaft connected to said end, a gear train housed within said open end, a drive shaft, means for connecting said drive shaft to operate said train, means for rendering the rotation of said train effective to said body to cause the same to rotate in one direction, and throttle means rotatable with said body for offering a resistance to the flow of a fluid compressed by said pump, said throttle means being eccentric to said body whereby the reaction of the throttle is taken up by said body as a moment for turning the body in an opposite direction relatively to that of the gear drive.

4. The herein described transmission for Ford cars comprising a body constituting a brake drum, a gear train mounted within said body, a pair of co-axial shafts one of which is connected co-axially with said body while the other co-operates with said gear train so as to transmit motion from one shaft to the other, a pump within said body and having driving co-operation with the shaft which co-operates with said gear train, throttling means for said pump adapted to create a reaction upon said body as a result of a restricted flow of the fluid compressed by said pump so as to transmit a rotary force from one shaft to the other, and means for rendering said gear train ineffective for transmitting motion as aforesaid when said pump is used, said throttle means being opened when said gear train is in use to render said pump ineffective.

In testimony whereof I affix my signature.

HARRY W. LLOYD.